L. E. WOOD.
SPRING LEAF SPREADER AND LUBRICATOR.
APPLICATION FILED MAR. 8, 1920.
1,351,272.
Patented Aug. 31, 1920.
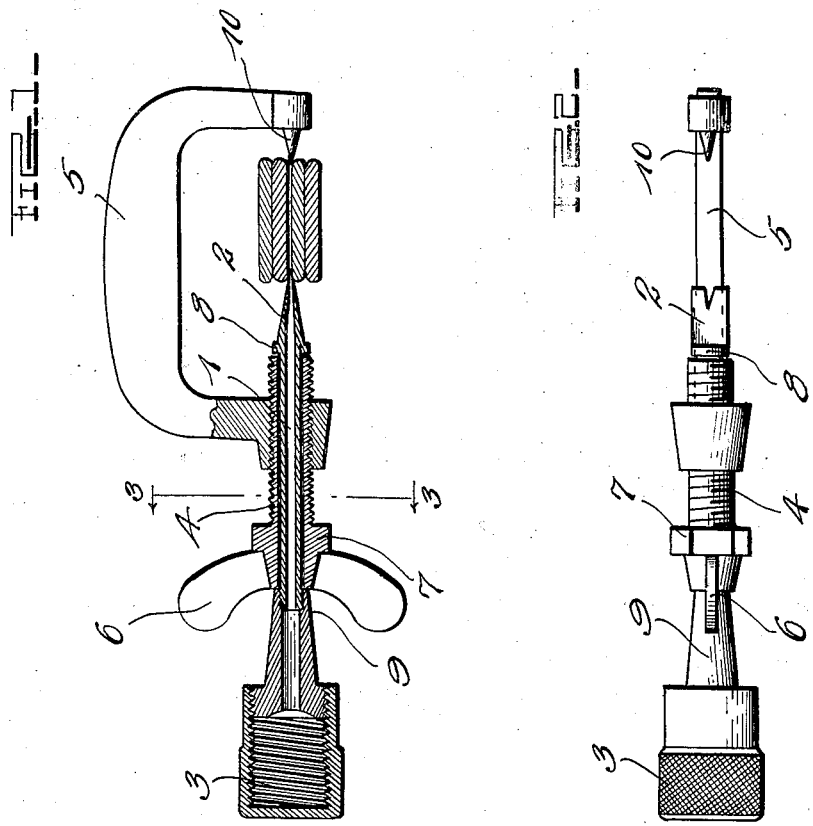
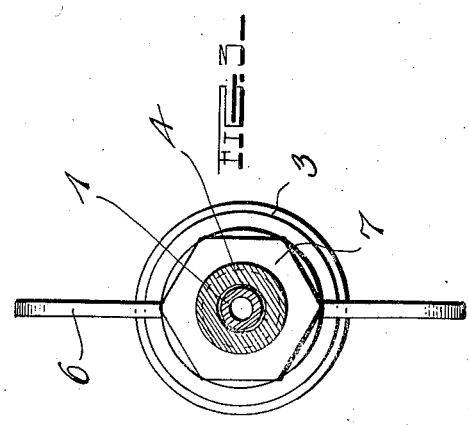
Witness
Inventor
L. E. Wood
By
Attorneys

UNITED STATES PATENT OFFICE.

LOUIS E. WOOD, OF FARRELL, PENNSYLVANIA.

SPRING-LEAF SPREADER AND LUBRICATOR.

1,351,272.  Specification of Letters Patent.  Patented Aug. 31, 1920.

Application filed March 8, 1920. Serial No. 364,334.

*To all whom it may concern:*

Be it known that I, LOUIS E. WOOD, a citizen of the United States, residing at Farrell, in the county of Mercer and State of Pennsylvania, have invented certain new and useful Improvements in Spring-Leaf Spreaders and Lubricators; and I do declare the following to be a full, clear, and exact description of the invention, such as will enable others skilled in the art to which it appertains to make and use the same.

My invention relates to improvements in devices for lubricating vehicle springs, and more particularly to those which first spread the leaves of the spring and then inject a suitable lubricant between them. I am aware that devices of this general class have been heretofore provided, but my invention aims to improve upon them to such an extent as to provide an extremely simple and inexpensive, yet a highly efficient and reliable device, which may be operated entirely from either the outer side or the inner side of the spring, as may be most convenient. This is of great advantage, since it often happens that the springs are inaccessible at some places from their inner sides, and others from their outer sides. In either case, the device may be operated from one side of the spring only and thus all parts of the spring may be effectively lubricated.

With the foregoing in view, the invention resides in the novel construction and arrangement of parts hereinafter fully described and claimed, the descriptive matter being supplemented by the accompanying drawing.

Figure 1 is a longitudinal section of a device constructed in accordance with my invention, parts being in elevation.

Fig. 2 is an edge view.

Fig. 3 is a transverse section on the plane of line 3—3 of Fig. 1.

In carrying out my invention, I provide a tubular lubricant conducting member 1 having a wedge 2 at one end for spreading the leaves of a vehicle spring, while its other end is provided with appropriate means 3 for feeding grease or other lubricant. For projecting the member 1 and its wedge 2, I provide a screw 4, this screw being threaded through one end of a spring-embracing yoke 5. On the end of the screw adjacent the lubricant feeding means 3, I make provision for rotating said screw, and although such provision may vary as occasion may demand, I prefer to provide a pair of wings 6 for turning the screw by hand, and a hexagonal head 7 for operating said screw with a wrench or the like should this be necessary.

In the preferred form of my invention, the lubricant conducting member 1 is in the form of a metal tube as shown clearly in Fig. 1, with the wedge 2 formed integrally with one of its ends. This end is also provided with a continuous external shoulder 8 serving as a thrust bearing against which the screw 4 acts. This screw is preferably of tubular form and is rotatable about the tube 1, being confined on said tube between the shoulder 8 and the nipple 9 of the grease cup or the like 3, said nipple being threaded on the end of the tube 1 remote from the shoulder.

Preferably though not necessarily, the end of the yoke 5, opposite the end thereof carrying the parts above described, is provided with a preferably conical wedge 10 which co-acts with the wedge 2 in spreading the leaves of the springs as indicated in Fig. 1.

In operation, the yoke 5 is placed over or under the spring, either from the outer or inner side of the latter, as most convenient. The screw 4 is then operated to force the tube 1 and its wedge 2 inwardly so that said wedge is received between the leaves of the spring to spread the latter, the other wedge 10 assisting in this operation when used. When the spring leaves have been adequately separated, the grease cup or other lubricant feeding device 3 is operated to inject a quantity of the lubricating material through the tube 1 and the wedge 2, depositing the same between the spread leaves of the spring. Attention is here directed to the fact that both the screw 4 and the lubricant feeding means 3, are operable from the same side of the vehicle spring, thus adapting the device for convenient use on springs which could not be lubricated by similar devices in which both ends of the yoke 5 are encumbered by projecting parts.

From the foregoing, taken in connection with the accompanying drawing, it will be seen that I have provided an extremely simple and inexpensive spring leaf spreader and lubricator, yet one which will be highly efficient and desirable. Since probably the best results may be obtained from the details disclosed, such details may well be followed, but I wish it understood that within the scope of the invention as claimed, numerous modifications may well be made.

I claim:

1. A spring leaf spreader and lubricator conprising a tubular lubricant conducting member having a leaf spreading wedge at one end and lubricant feeding means at its other end, a screw for projecting said member to spread the leaves of the spring, the operating means of said screw being located adjacent to said lubricant feeding means, and a spring-straddling yoke through which the screw is threaded, said screw being tubular, receiving said lubricant conducting member therein, and being rotatable about said member.

2. A spring leaf spreader and lubricator comprising a spring-straddling yoke, a tubular screw threaded through one end of said yoke, a tube passing loosely through said tubular screw and having a leaf spreading wedge and an external shoulder at one end, and a lubricant feeding device mounted on the other end of said tube, said screw being confined between said shoulder and said feeding device and having operating means adjacent the latter.

In testimony whereof I have hereunto set my hand.

LOUIS E. WOOD.